United States Patent [19]
Katoh

[11] Patent Number: 5,732,160
[45] Date of Patent: Mar. 24, 1998

[54] DIGITAL IMAGE CONTOUR COMPENSATION DEVICE

[75] Inventor: Satoshi Katoh, Tokyo, Japan

[73] Assignee: NEC Corporation, Tokyo, Japan

[21] Appl. No.: 637,420

[22] Filed: Apr. 25, 1996

[30] Foreign Application Priority Data

Apr. 26, 1995 [JP] Japan .................. 7-101965

[51] Int. Cl.$^6$ .................. G06T 5/00; H04N 1/409
[52] U.S. Cl. .................. 382/263; 358/447
[58] Field of Search .................. 382/263, 266, 382/267, 269, 254; 358/447

[56] References Cited

U.S. PATENT DOCUMENTS 4,672,463  6/1987  Tomohisa et al. .................. 358/447
5,151,787  9/1992  Park .................. 382/268

Primary Examiner—Scott A. Rogers
Attorney, Agent, or Firm—Foley & Lardner

[57] ABSTRACT

A total of 2 N-1 serially connected delay circuits sequentially delay a digital image signal, where N is a positive integer, and a total of N-1 adders each respectively add a pair of delayed signals output from (N±k)-th ones of the 2 N-1 delay circuits, where k is an arbitrary positive integer such that k<N, while a selector is responsible for a boost frequency to select an output signal of one of the N-1 adders. A first multiplier multiplies the selected signal by a first coefficient, a second multiplier multiplies an output signal of an N-th one of the 2 N-1 delay circutis by a second coefficient, and another adder synthesizes output signals of the first and second multipliers.

3 Claims, 10 Drawing Sheets

FIG. 2A PRIOR ART

| -1/2 | 1 | -1/2 |

FIG. 2B PRIOR ART

|  | -1/4 |  |
| -1/4 | 1 | -1/4 |
|  | -1/4 |  |

FIG. 2C PRIOR ART

| -1/8 | -1/8 | -1/8 |
| -1/8 | 1 | -1/8 |
| -1/8 | -1/8 | -1/8 |

FIG. 4A

| | | $-\frac{1}{2}$ | 1 | $-\frac{1}{2}$ | | |
|---|---|---|---|---|---|---|
| S1 | S2 | S3 | S4 | S5 | S6 | S7 |

FIG. 4B

| | $-\frac{1}{2}$ | | 1 | | $-\frac{1}{2}$ | |
|---|---|---|---|---|---|---|
| S1 | S2 | S3 | S4 | S5 | S6 | S7 |

FIG. 4C

| $-\frac{1}{2}$ | | | 1 | | | $-\frac{1}{2}$ |
|---|---|---|---|---|---|---|
| S1 | S2 | S3 | S4 | S5 | S6 | S7 |

DIGITAL IMAGE CONTOUR COMPENSATION DEVICE

BACKGROUND OF THE INVENTION

The present invention generally relates to a digital image contour compensation device, and particularly, to a digital image contour compensation device for compensating a contour of an image represented by an image signal, such as a video signal input from an image pick-up device.

DESCRIPTION OF THE RELATED ART

There have been known digital image contour compensation devices of the type in which an image signal consisting of a sequence of pixel data is processed by a digital filter circuit so that a level difference between data is emphasized for compensating an image contour to provide a defined or sharpened image.

In such the type of digital image contour compensation devices, the digital filter circuit typically comprises a parallel connection of a plurality of digital filters each implemented for a horizontal compensation to emphasize a level difference in a horizontal direction of a picture frame so that a vertical contour becomes sharp. The parallel digital filters are cooperative with each other for effecting a horizontal compensation, a vertical compensation and an oblique compensation, alone or in combination. The horizontal direction may be a vertical direction, as circumstances require.

FIG. 1 is a block diagram of an arbitrary one of a plurality of parallel-connected digital filters constituting a conventional digital image contour compensation circuit.

The digital filter of FIG. 1 comprises a distributor 58 composed of a total of seven serially connected delay circuits 51 to 57, a total of seven coefficient multipliers 61 to 67 connected at their input ends in parallel to output ends of the seven delay circuits 51 to 57, respectively, and controlled by a controller 68, and a total of six adders 71 to 76 for synthesizing outputs of the seven coefficient multipliers 61 to 67 in a tournament system.

The illustrated diagram of connections among coefficient multipliers and adders is a mere example. Letting n be the number of delay circuits, the coefficient multipliers and the adders typically amount to n and n−1, respectively. The number n is an odd.

In FIG. 1, an image signal incomming from an input terminal IN is input to the distributor 58, where it is delayed by one clock (hereafter "CLK") at each of the seven delay circuits 51 to 57, which thus output a total of seven image signals with delays of 1 CLK to 7 CLKs.

In other words, letting Di (i=1 to n) be a delay at an i-th one of serially connected n delay circuits, a central j-th (j={(n−1)/2}+1) one of the n delay circuits provides an image signal with a delay Dj of [{(n−1)/2}+1] CLKs representative of a mean delay, and k-th delay circuits therefrom, i.e., (j±k)-th ones of the n delay circuits provide image signals with delays D(j±k) different by (j±k) CLKs from the mean delay Dj.

Therefore, among the seven delay circuits 51 to 57 of FIG. 1, the fourth one 54 outputs an image signal with a mean delay D4 of 4 CLKs, and e.g. the third one 53 and the fifth one 55 output an image signal with a delay D3 of 3 (=4−1) CLKs and an image signal with a delay D5 of 5 (=4+1) CLKs. respectively.

A respective one of the seven delayed image signals is input to a corresponding one of the seven coefficient multipliers 61 to 67, where it is multiplied by a coefficient that the controller 68 has assigned to effect an image contour compensation, as necessary.

The seven multiplied image signals are input to four of the six adders 71 to 76. More specifically, letting j=4, a combination of the multiplied image signal output from the (j−3)-th (i.e. first) coefficient multiplier 61 with a 1-CLK delay and that output from the (j+3)-th (i.e. seventh) coefficient multiplier 67 with a 7-CLK delay is input to the adder 71, a combination of the multiplied image signal output from the (j−2)-th (i.e. second) coefficient multiplier 62 with a 2-CLK delay and that output from the (j+2)-th (i.e. sixth) coefficient multiplier 66 with a 6-CLK delay is input to the adder 72, a combination of the multiplied image signal output from the (j−1)-th (i.e. third) coefficient multiplier 68 with a 3-CLK delay and that output from the (j+1)-th (i.e. fifth) coefficient multiplier 65 with a 5-CLK delay is input to the adder 73, and an image signal output from this adder 78 and the multiplied image signal output from the central j-th (i.e. fourth) coefficient multiplier 64 with a 4-CLK delay are added to each other at the adder 75.

Image signals output from the adders 71 and 72 are added to each other at the adder 74, and image signals output from the adders 74 and 75 are added to each other at the adder 76. Finally, an image signal output from the adder 76 goes out as a contour compensation signal from an output terminal OUT.

FIGS. 2A to 2C are exemplary multiplication coefficient tables applicable to the digital filters of FIG. 1 for a horizontal compensation, for a combination of a horizontal compensation and a vertical compensation and for a combination of a horizontal compensation, a vertical compensation and an oblique compensation, respectively, while the tables have omitted rows and columns, as they list a zero coefficient value.

The table shown in FIG. 2A has at a (2,2) address thereof a coefficient "1" to be assigned to the central fourth coefficient multiplier 64, at a (2,1) address thereof a coefficient "−½" to be assigned to the third coefficient multiplier 63, and at a (2,3) address thereof a coefficient "−½" to be assigned to the fifth coefficient multiplier 65, for the horizontal compensation, as the digital filter of FIG. 1 is a central filter in the conventional digital image contour compensation circuit.

Respective blank addresses have a coefficient "0".

The table shown in FIG. 2B has at a (2,2) address thereof a coefficient "1" to be assigned to the central fourth coefficient multiplier 64 and at (2,1) and (2,3) addresses thereof a coefficient "−¼" to be assigned to the third and fifth coefficient multipliers 63 and 65, respectively, for the horizontal compensation, as the digital filter in concern is a central filter, and at each of (1,2) and (3,2) addresses thereof a coefficient "−¼" to be assigned to the central fourth coefficient multiplier 64, for the vertical compensation, as the concerned digital filter is one of two filters neighboring the central filter.

The table shown in FIG. 2C has at a (2,2) address thereof a coefficient "1" to be assigned to the central fourth coefficient multiplier 64 and at (2,1) and (2,3) addresses thereof a coefficient "−⅛" to be assigned to the third and fifth coefficient multipliers 63 and 65, respectively, for the horizontal compensation, as the digital filter is a central filter, and at each of (1,2) and (3,2) addresses thereof a coefficient "−⅛" to be assigned to the central fourth coefficient multiplier 64 for the vertical compensation and at each of (1,1), (1,3), (3,1) and (3,3) addresses thereof a coefficient "−⅛" to be assigned to a corresponding one of the third and fifth coefficient multiplier 63 or 65 for the oblique compensation, as the digital filter is one of two filters neighboring the central filter.

In each multiplication coefficient table, a central address has a coefficient "1", and an arbitary pair of addresses symmetrical to each other with respect to the central address have an identical coefficient. A total sum of coefficients in each table equals "0".

The digital filter of FIG. 1 has a significant number of components.

To this point, a conventional implementation has omitted a low-pass filter. Another conventional implementation has employed a simplified digital filter.

However, in each conventional case, a coefficient multiplier is necessary for a respective one of delayed signals output from a distributor.

Therefore, with an increased total number of delay stages, a total number of coefficient multipliers as well as that of adders increases, resulting in a complicated arrangement, causing a scaled-up device, an increased power consumption and a decreased cost effect.

The present invention has been achieved with such points in mind.

SUMMARY OF THE INVENTION

It therefore is an object of the present invention to provide a digital image contour compensation device permitting an efficient circuit arrangement for a down-sizing and energy saving.

To achieve the object, a genus of the present invention provides a digital image contour compensation device having a boost frequency, the device comprising a total of 2N-1 delay circuits serially connected for sequentially delaying a digital image signal, where N is a positive integer, a total of N-1 adders each respectively for adding a pair of delayed signals output from (N±k)-th ones of the 2N-1 delay circuits, where k is an arbitrary positive integer such that k<N, a select means responsible for the boost frequency to select an output signal of one of the N-1 adders to provide a selected signal, a first multiplier for multiplying the selected signal by a first coefficient, a second multiplier for multiplying an output signal of an N-th one of the 2N-1 delay circutis by a second coefficient, and another adder for synthesizing output signals of the first and second multipliers.

According to the genus of the invention, in a digital image contour compensation device including a total of 2N-1 delay circuits serially connected for distributing a total of 2N-1 delayed signals, a total of 2N-2 of the 2N-1 delayed signals are combined in pairs to be added to provide a total of N-1 added signals of which an adequate one is selected to be multiplied at a first multiplier by a first coefficient, while a delayed signal output from a central N-th delay circuit is multiplied at a second multiplier by a second coefficient, before output signals of the first and second multipliers are synthesized to provide a contour compensation signal.

Therefore, the number of coefficient multipliers is as small as two irrespective of the number of delay circuits.

Moreover, to achieve the object described, another genus of the present invention provides a digital image contour compensation device comprising a first variable delay circuit for delaying an input image signal to provide a first delayed signal, a second variable delay circuit for delaying the first delayed signal to provide a second delayed signal, a control means for controlling delay times of the first and second delay circuits, a first multiplier for multiplying the first delayed signal by a first coefficient, a first adder for adding the second delayed signal to the input image signal to provide an added signal, a second multiplier for multiplying the added signal by a second coefficient, and a second adder for synthesizing output signals of the first and second multipliers.

According to this genus of the invention, in a digital image contour compensation device, an image signal is input to a first variable delay circuit, where it is delayed by a controlle delay to provide a first delayed signal that is input on the one hand to a first multiplier, where it is multiplied by a first coefficient, and on the other hand to a second variable delay circuit, where it is delayed by a controlled delay time to provide a second delayed signal that is added to the input image signal at a first adder to provide an added signal that is input to a second multiplier, where it is multiplied by a second coefficient, and respective outputs of the first and second multipliers are synthesized at a second adder to privide a contour compensation signal.

Therefore, the number of delay circuits as well as those of adders and coefficient multipliers is as small as two, irrespective of the number of delay circuits.

According to a species of this genus of the invention, the digital image contour compensation device has a boost frequency, and the control means is responsible for the boost frequency to generate a pulse signal for controlling the delay times of the first and second delay circuits.

BRIEF DESCRIPTION OF THE DRAWINGS

The objects, features and advantages of the present invention will become more apparent from consideration of the following detailed description, in conjunction with the accompanying drawings, in which:

FIGS. 2A to 2C are exemplary multiplication coefficient tables applicable to the digital filters of FIG. 1;

FIGS. 4A to 4C are exemplary multiplication coefficient tables applicable to the digital filter of FIG. 3;

DESCRIPTION OF THE PREFERRED EMBODIMENTS

Figure 1:
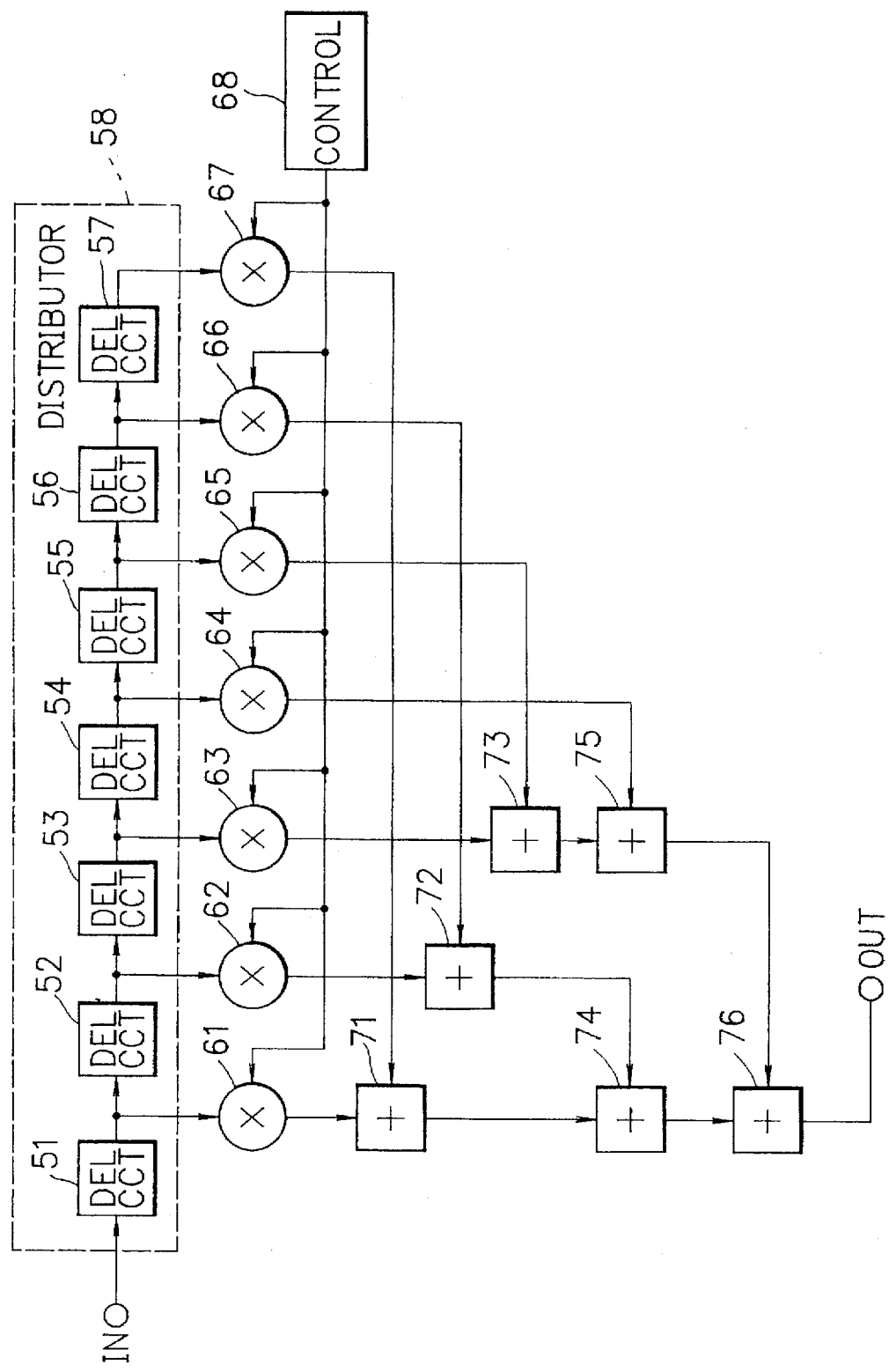
FIG. 1 is a block diagram of an arbitrary one of a plurality of parallel-connected digital filters constituting a conventional digital image contour compensation circuit.

There will be detailed below the preferred embodiments of the present invention with reference to the accompanying drawing. Like members are designated by like reference characters.

Figure 3:
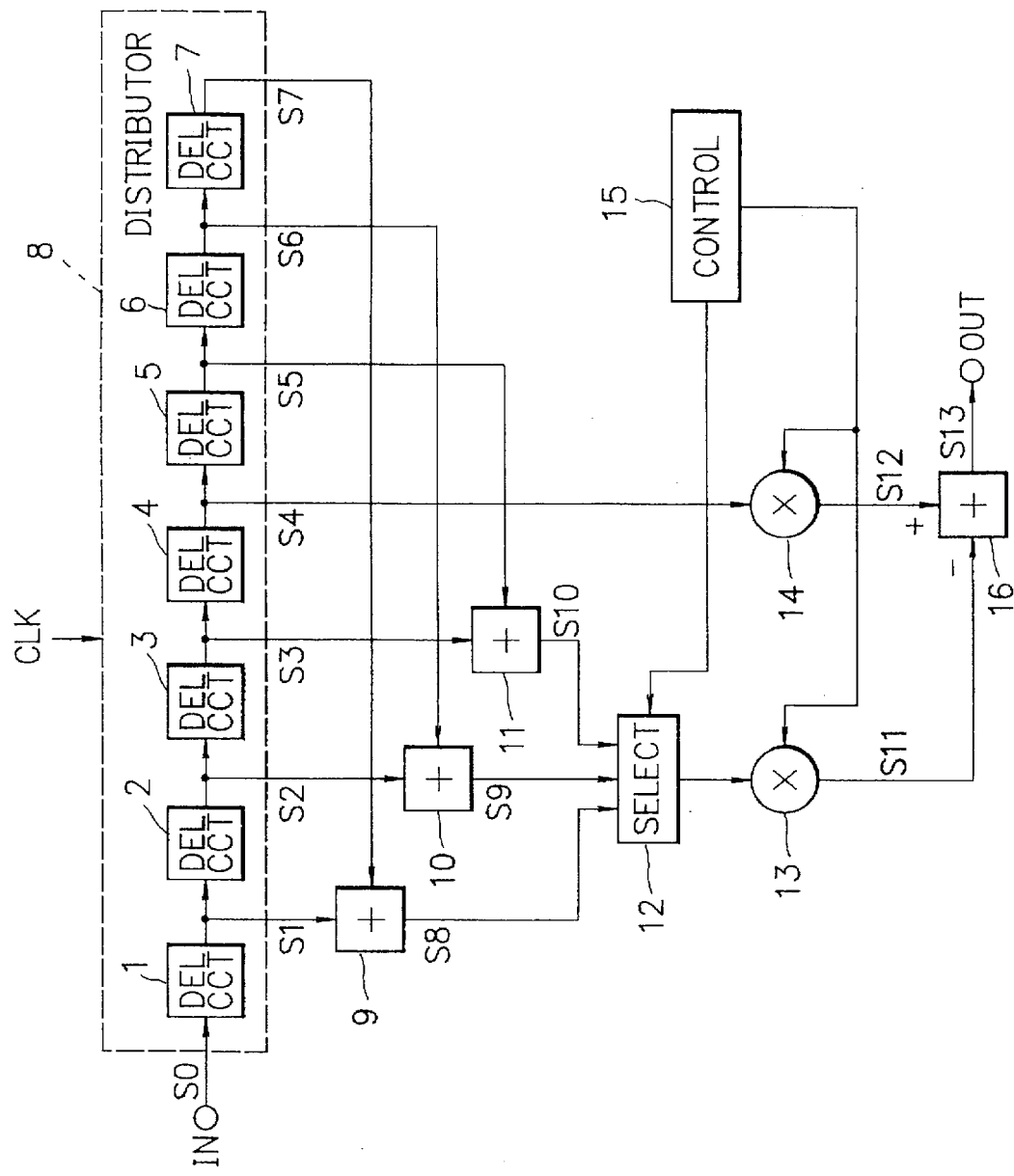
FIG. 3 is a block diagram of a central one of a plurality of parallel-connected digital filters constituting a digital image contour compensation circuit according to an embodiment of the invention.

FIG. 3 is a block diagram of a central one of a plurality of parallel-connected digital filters constituting a digital image contour compensation circuit according to an embodiment of the invention, and FIGS. 4A to 4C are exemplary multiplication coefficient tables applicable to the digital filter of FIG. 3.

As shown in FIG. 3, the central digital filter comprises: a distributor 8 composed of a total of seven serially connected delay circuits 1 to 7, as they are selected by an unshown switching from among a multiplicity of delay circuits employable to constitute the digital filters; an adder 9 for adding an output signal S1 of a first one 1 of the delay circuits 1 to 7 and an output signal S7 of a seventh one 7 of the delay circuits 1 to 7; an adder 10 for adding an output signal S2 of a second one 2 of the delay circuits 1 to 7 and an output signal S6 of a sixth one 6 of the delay circuits 1 to 7; an adder 11 for adding an output signal S3 of a third one 3 of the delay circuits 1 to 7 and an output signal S5 of a fifth one 5 of the delay circuits 1 to 7; a selector 12 responsive to a selection control signal for selecting one of output signals S8 to S10 of the adders 9 to 11; a controller 15 responsible for a boost frequency of the digital image contour compensation circuit to provide the selection control signal and for outputting representative signals of corresponding ones of multiplication coefficients listed in one of the tables of FIGS. 4A to 4C; a coefficient multiplier 13 responsive to a corresponding one of the representative signals of multiplication coefficients for multiplying an output signal of the selector 12 by a corresponding coefficients; another coefficient multiplier 14 responsive to a corresponding one of the representative signals of multiplication coefficients for multiplying an output signal of a central fourth one 4 of the delay circuits 1 to 7 by a corresponding coefficients; another adder 16 as a synthesizer for subtracting an output signal S11 of the coefficient multiplier 13 from an output signal S12 of the coefficient multiplier 14 to provide a contour compensation signal S13 to be output via an output terminal OUT.

The seven delay circuits 1 to 7 of the distributor 8 are each respectively supplied with a synchronizing clock signal CLK so that they are each operable to delay an input signal thereto by a delay time of one CLK.

In each multiplication coefficient table, a central address has a coefficient "1", and an arbitary pair of addresses symmetrical to each other with respect to the central address have an identical coefficient. A total sum of coefficients in each table equals "0".

In a case the multiplication coefficient table of FIG. 4A is applied for a horizontal compensation, the output signal S4 of the central fourth delay circuit 4 that has a mean delay of 4 CLKs is required to be multiplied by a coefficient "1", and those S3 and S5 of the third and fifth delay circuits 3 and 5 that have delays of 3 CLKs and 5 CLKs are required to be multiplied by a coefficient "−½", respectively.

In a case the multiplication coefficient table of FIG. 4B is applied for a horizontal compensation, the output signal S4 of the central fourth delay circuit 4 is required to be multiplied by a coefficient "1", and those S2 and S6 of the second and sixth delay circuits 2 and 6 that have delays of 2 CLKs and 6 CLKs are requried to be multiplied by a coefficient "−½", respectively.

In a case the multiplication coefficient table of FIG. 4C is applied for a horizontal compensation, the output signal S4 of the central fourth delay circuit 4 is required to be multiplied by a coefficient "1", and those S1 and S7 of the first and seventh delay circuits 1 and 7 that have delays of 1 CLK and 7 CLKs are requried to be multiplied by a coefficient "−½", respectively.

There will be described below actions of the digital filter of FIG. 3.

An incomming image signal S0 from an input terminal IN is input to the first delay circuit 1, where it is delayed by 1 CLK to provide a first delayed signal as the signal S1 that is input to the second delay circuit 2, where it is delayed by 1 CLK to provide a second delayed signal as the signal S2 that is input to the third delay circuit 3, where it is delayed by 1 CLK to provide a third delayed signal as the signal S3 that is input to the central fourth delay circuit 4, where it is delayed by 1 CLK to provide a fourth delayed signal as the signal S4 that is input to the fifth delay circuit 5, where it is delayed by 1 CLK to provide a fifth delayed signal as the signal S5 that is input to the sixth delay circuit 6, where it is delayed by 1 CLK to provide a sixth delayed signal as the signal S6 that is input to the seventh delay circuit 7, where it is delayed by 1 CLK to provide a seventh delayed signal as the signal S7.

Three pairs of delayed signals S1/S7, S2/S6 and S3/S5, i.e., six of the seven delayed signals S1 to S7 except the fourth one S4 are input to the three adders 9, 10 and 11, respectively, where they are added to provide added signals as the signals S8, S9 and S10.

Figure 5:
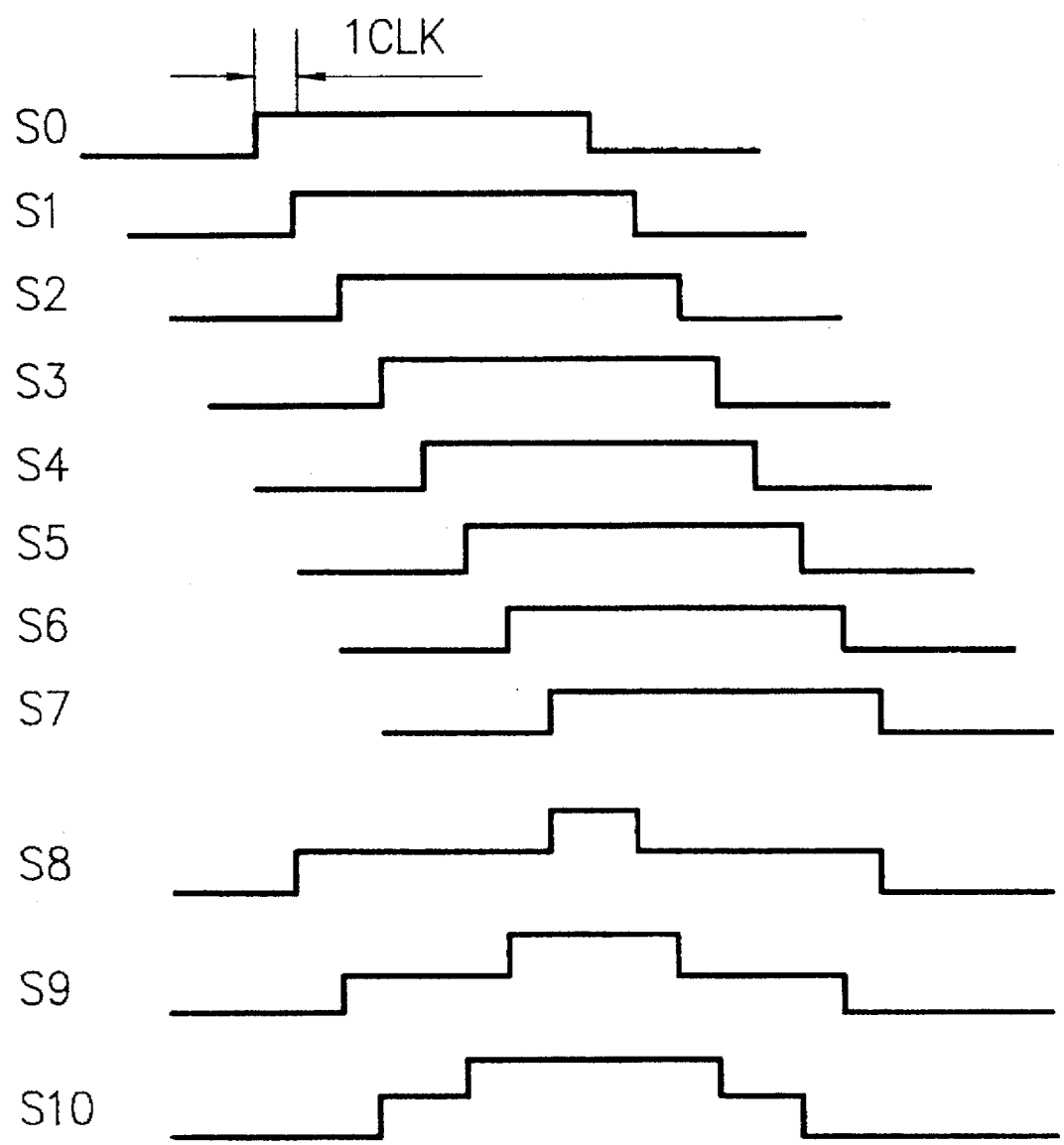
FIG. 5 illustrates time charts of various signals in the digital filter of FIG. 3.

FIG. 5 shows time charts of the signals S1 to S10.

The adder 9 adds the first delayd signal S1 that has a delay difference of −3 CLKs relative to the fourth delayed signal S4 and the seventh delayd signal S7 that has a delay difference of +3 CLKs relative to the fourth delayed signal S4 to provide the added signal S8.

The adder 10 adds the second delayd signal S2 that has a delay difference of −2 CLKs relative to the fourth delayed signal S4 and the sixth delayd signal S6 that has delay difference of +2 CLKs relative to the fourth delayed signal S4 to provide the added signal S9.

The adder 11 adds the third delayd signal S3 that has a delay difference of −1 CLK relative to the fourth delayed signal S4 and the fifth delayd signal S5 that has a delay difference of +1 CLK relative to the fourth delayed signal S4 to provide the added signal S10.

The three added signals S8 to S10 are input to the selector 12, where one of them is selected in accordance with the selection control signal that is provided from the controller 15 in dependence on the boost frequency.

In other words, the boost frequency is informed to the controller 15, as it is determined when one of the multiplication coefficient tables of FIGS. 4A to 4C is selected to be applied.

Figure 6A:
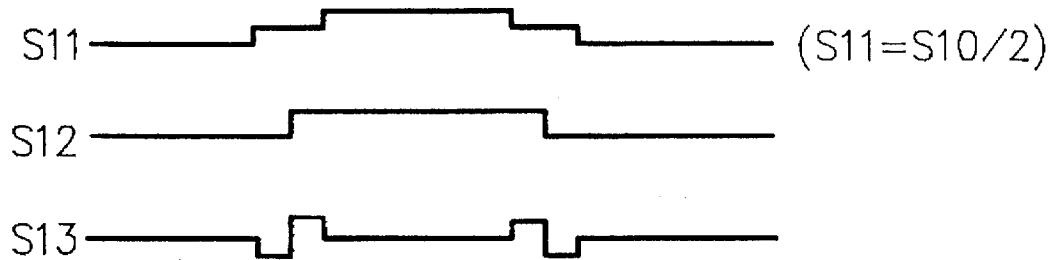
FIGS. 6A to 6C illustrate time charts of image signals processed in the digital filter of FIG. 3, as the multiplication coefficient tables of FIGS. 4A to 4C are applied, respectively.
Figure 6B:
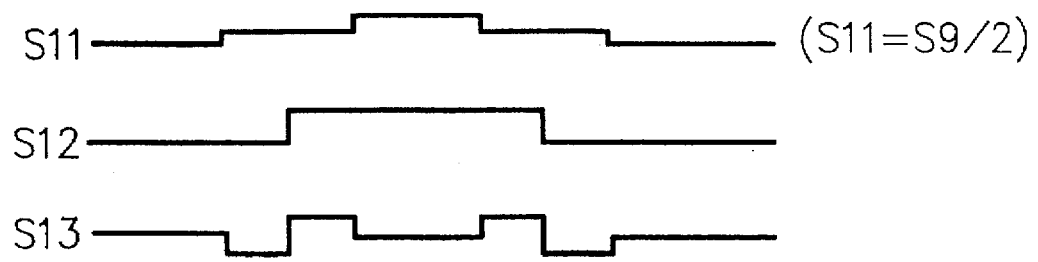
Figure 6C:
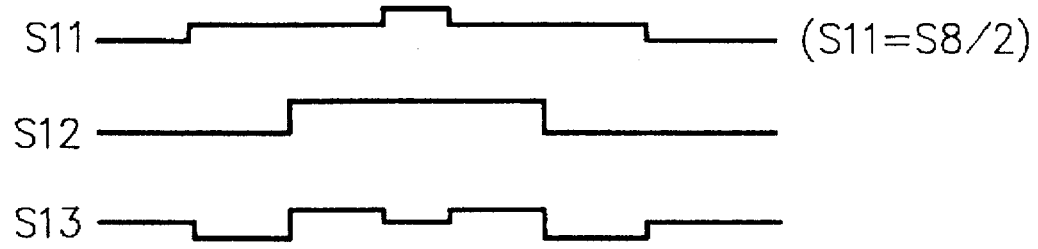

FIGS. 6A to 6C illustrate time charts of image signals processed in the digital filter of FIG. 3, as the multiplication coefficient tables of FIGS. 4A to 4C are applied, respectively.

In the case the table of FIG. 4A is applied, the digital filter of FIG. 3 operates like FIG. 6A so that the selector 12 selects the output signal S10 of the adder 11, which signal S10 is multiplied by a coefficient "−½" at the coefficient multiplier 13 to provide the output signal S11, and the fourth delayed signal S4 is multiplied by the coefficient "1" at the coefficient multiplier 14 to provide the output signal S12, while the output signal S11 of the coefficient multiplier 13 is subtracted from the output signal S12 of the coefficient multiplier 14 to provide the contour compensation signal S13.

The contour compensation signal S13 has a frequency characteristic F as a function of a frequency f, such that:

$$F = k * \sin^2(\pi \tau F) \quad (1),$$

where k is a constant, and τ is an absolute delay difference in sec. that the third and fifth delayed signals S3 and S5 have to the fourth delayed signal S4.

Letting fc be a clock frequency in Hz, it so follows that:

$$\tau = 1 \text{ CLK} = 1/fc \text{ [sec]}.$$

The boost frequency is defined as a value of the frequency f that gives a maximum value Fmax of the function F, so that from the expression (1):

$$F_{max} = \{k*\sin^2(\pi\tau f)\}_{max} = k.$$

Hence, $$\sin^2(\pi\tau f) = 1.$$

Therefore, $$\tau f = (\tfrac{1}{2})n.$$

where n is an integer.

Thus, $$f = (1/2\tau)n = (fc/2)n \text{ [Hz]} \quad (2).$$

Accordingly, the boost frequency in this case equals half the clock frequency fc times the integer n.

In the case the table of FIG. 4B is applied, the digital filter of FIG. 3 operates like FIG. 6B so that the selector 12 selects the output signal S9 of the adder 10. Other actions are analogous to those of the case of FIG. 6A, i. e. the signal S9 is multiplied by a coefficient "½" at the coefficient multiplier 13 to provide the output signal S11, and the fourth delayed signal S4 is multiplied by the coefficient "1" at the coefficient multiplier 14 to provide the output signal S12, while the output signal S11 of the coefficient multiplier 13 is subtracted from the output signal S12 of the coefficient multiplier 14 to provide the contour compensation signal S13.

In this case, as τ=2CKLs=2/fc [sec] in the expression (1), the boost frequency f is determined such that:

$$f = (1/2\tau)n = (fc/4)n \text{ [Hz]} \quad (3),$$

which is equivalent to half a value of the case of FIG. 6A times an integer n.

In the case the table of FIG. 4C is applied, the digital filter of FIG. 3 operates like FIG. 6C so that the selector 12 selects the output signal S8 of the adder 9. Other actions are analogous to those of the case of FIG. 6A.

Therefore, τ=3 CKLs=3/fc [sec] in the expression (1), and the boost frequency f is determined such that:

$$f = (1/2\tau)n = (fc/6)n \text{ [Hz]} \quad (4),$$

which is equivalent to one third of the value of the case of FIG. 6A times an integer n.

In the present embodiment, the number of delay circuits is set to 7, which may be modified in a voluntary manner.

Moreover, another selector similar to the selector 12 may be provided for selecting one of additional pairs of delayed signals in a large-scaled circuit arrangement.

Further, the present embodiment of the digital filter directed to a horizontal compensation may well be modified to cover any or all of horizontal, vertical and oblique compensation operations.

Figure 7:
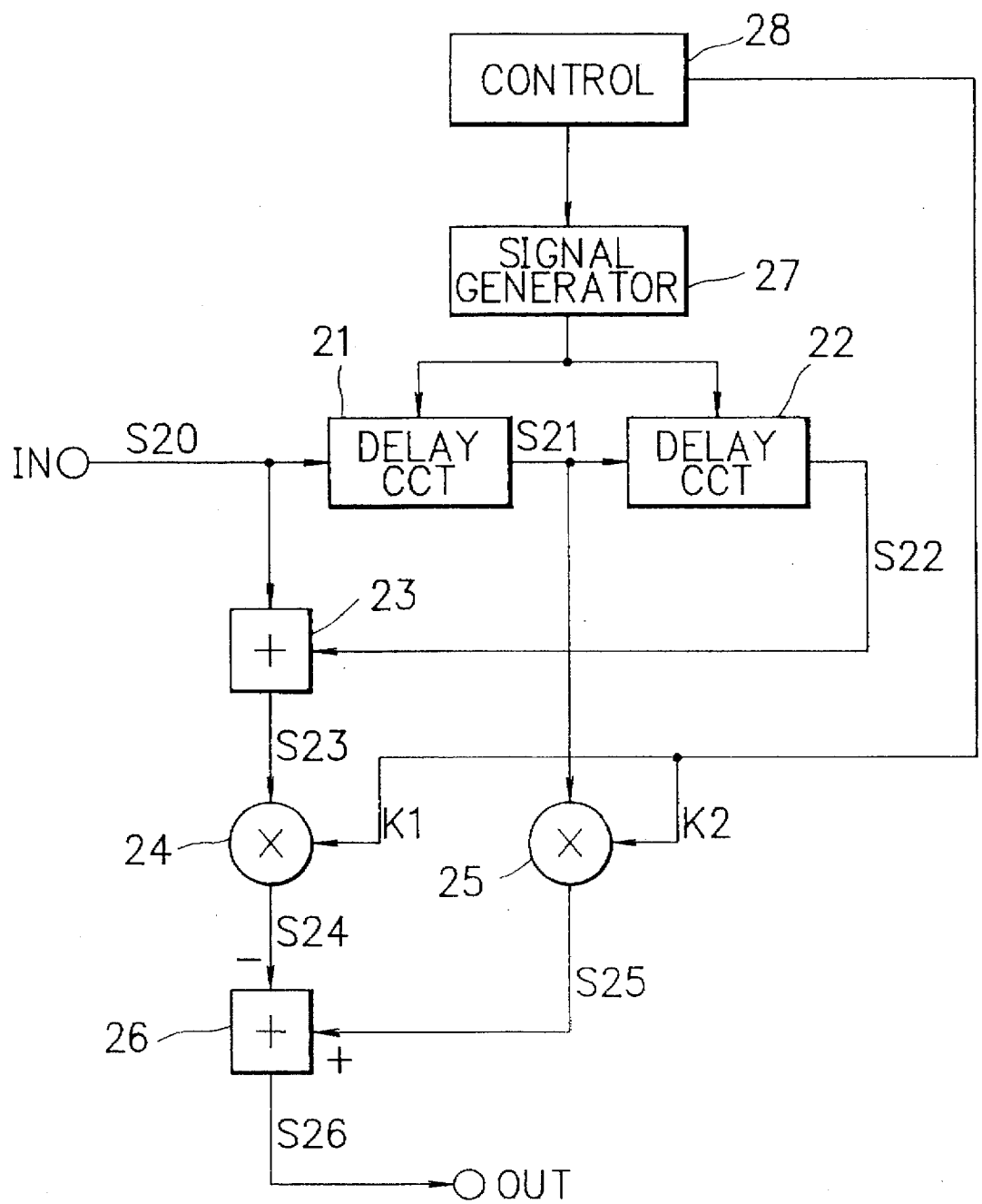
FIG. 7 is a block diagram of a central one of a plurality of parallel-connected digital filters constituting a digital image contour compensation circuit according to another embodiment of the invention.

FIG. 7 is a block diagram of a central one of a plurality of parallel-connected digital filters constituting a digital image contour compensation circuit according to another embodiment of the invention.

The digital filter of FIG. 7 comprises: a first variable delay circuit 21 for delaying an input image signal S20 to provide a first delayed signal S21; a second variable delay circuit 22 for delaying the first delayed signal S21 to provide a second delayed signal S22; a first adder 23 for adding the second delayed signal S22 to the input image signal S20 to provide an added signal S23; a first coefficient multiplier 24 for multiplying the added signal S23 by a first coefficient K1; a second coefficient multiplier 25 for multiplying the first delayed signal S21 by a second coefficient K2; another adder 26 as a synthesizer for subtracting an output signal S24 of the first coefficient multiplier 24 from an output signal S25 of the second coefficient multiplier 25 to provide a contour compensation signal S26 to be output via an output terminal OUT; a signal generator 27 responsible for a delay time setting control signal to generate a pulse signal to control delay times of the first and second variable delay circuits 21 and 22; and a controller 28 responsible for a boost frequency to output the delay time setting control signal to the signal generator 27 and representative signals of corresponding coefficients K1 and K2 to the first and second coefficient multipliers 24 and 25, respectively, as the coefficients K1 and K2 are determined from one of the multiplication coefficient tables of FIGS. 4A to 4C.

Figure 8:
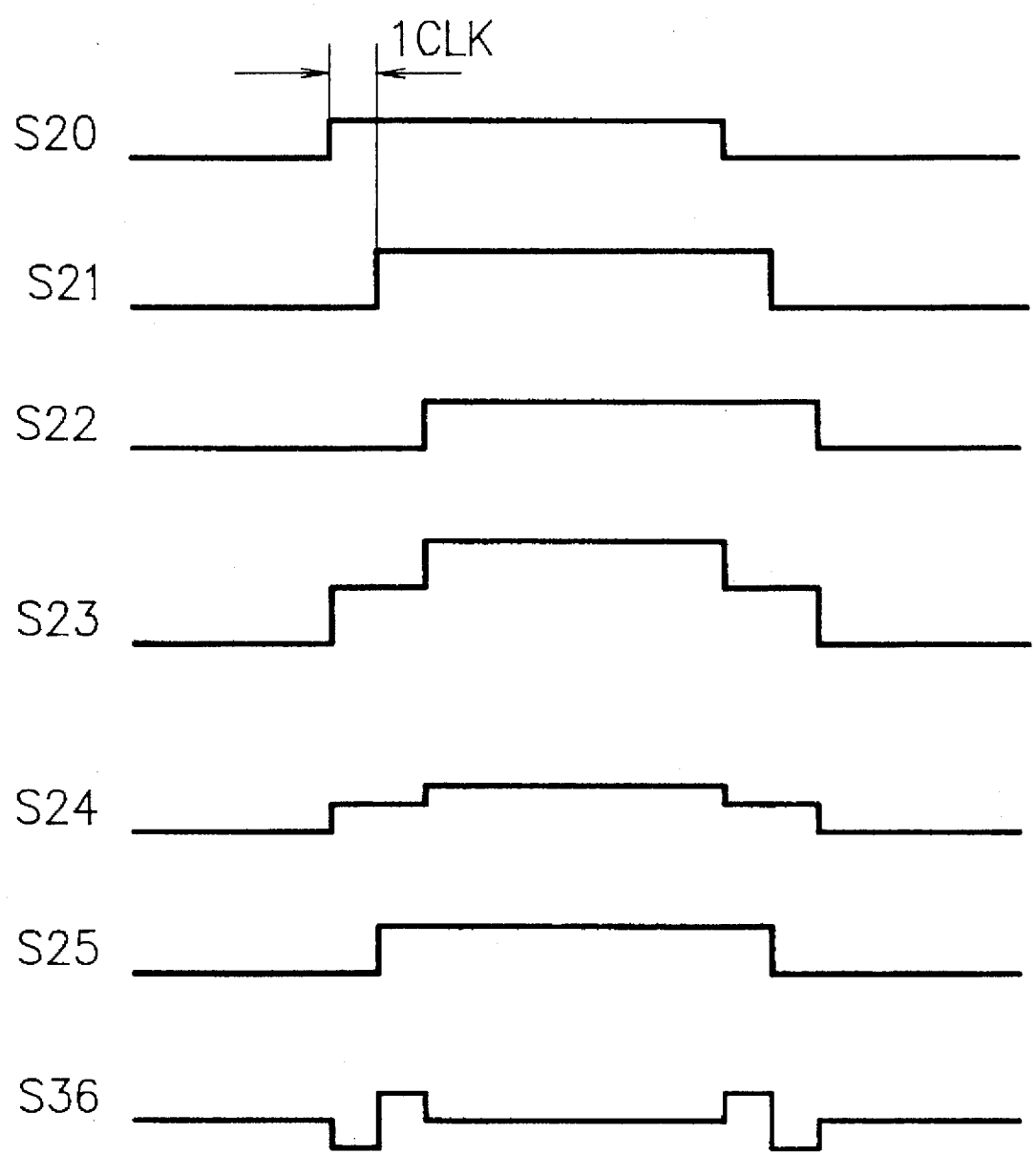
FIG. 8 illustrates time charts of various signals in the digital filter of FIG. 7, as the multiplication coefficient table of FIG. 4A is applied.

FIG. 8 illustrates time charts of various signals in the digital filter of FIG. 7, as the multiplication coefficient table of FIG. 4A is applied.

In the case of FIG. 8, the image signal S20 is input to the first delay circuit 21, where it is delayed by 1 CLK to provide the first delayed signal S21 in accordance with the control pulse that the signal generator 27 has generated in dependence on the delay time setting control signal supplied from the controller 28, which signal S21 is input to the second delay circuit 22, where it is delayed by 1 CLK to provide the second delayed signal S22 in a similar manner, which signal S22 is input together with the image signal S20 to the adder 23, where they are added to each other to provide the added signal S23.

The added signal S23 is input to the first coefficient multiplier 24, where it is multiplied by the coefficient K1 that is equivalent to "½" to provide a multiplied signal as the signal S24, and the first delayed signal S21 is input to the second coefficient multiplier 25, where it is multiplied by the coefficient K2 that is equivalent to "1" to provide a multiplied signal as the signal S25, while the multiplied signal S24 is subtracted from the multiplied signal S25 at the adder 26 to provide the contour compensation signal S26.

The contour compensation signal S26 has a frequency characteristic F as a function of the frequency f [Hz] and a delay time τ of the first and second delay circuits 21 and 22, which function can also be expressed by the expression (1). The boost frequency in this case also is equivalent to that of the expression (2) of the previous embodiment.

Figure 9:
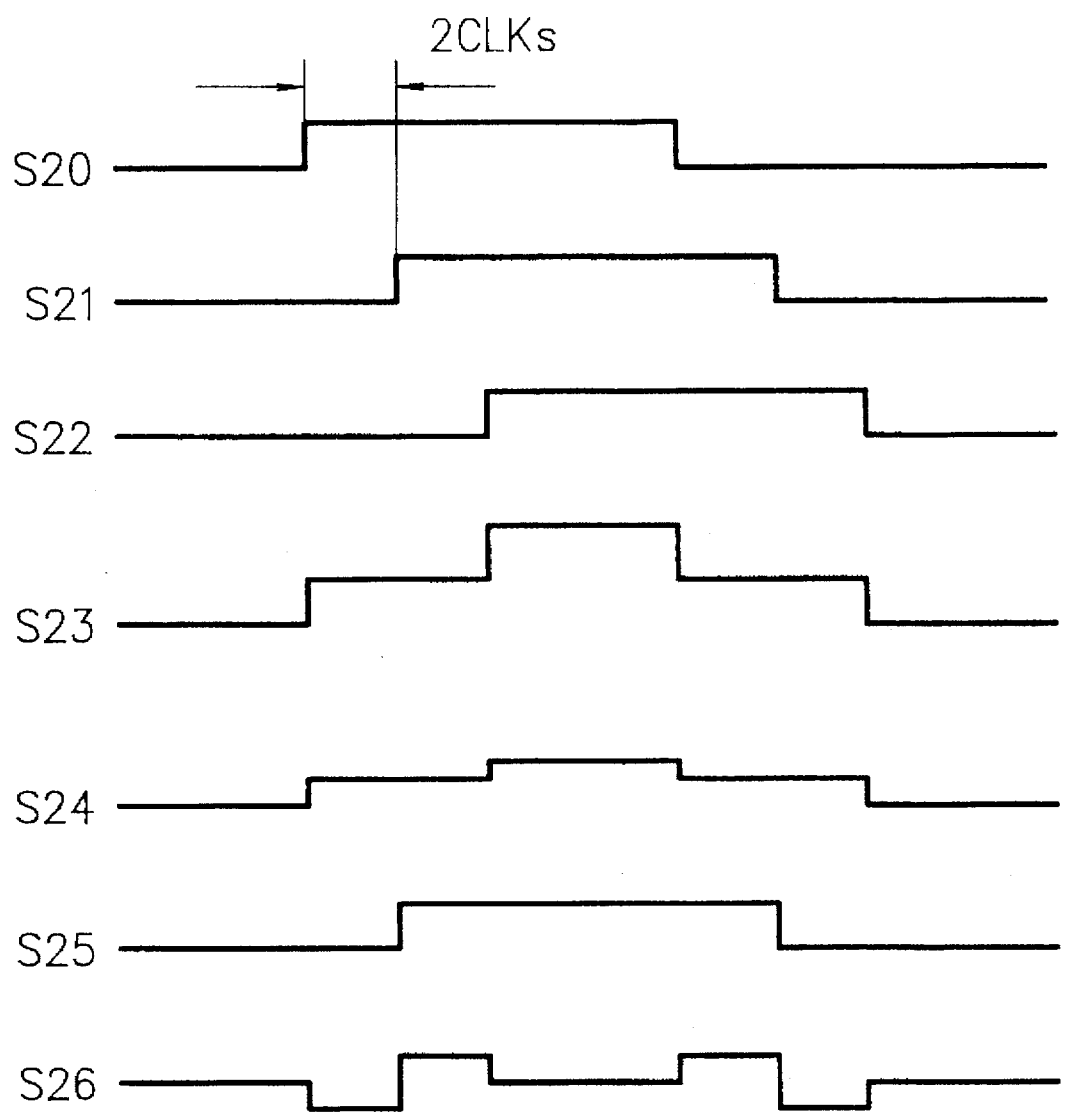
FIG. 9 illustrates time charts of various signals in the digital filter of FIG. 7, as the multiplication coefficient table of FIG. 4B is applied.

FIG. 9 illustrates time charts of various signals in the digital filter of FIG. 7, as the multiplication coefficient table of FIG. 4B is applied.

In the case of FIG. 9, the image signal S20 is input to the first delay circuit 21, where it is delayed by 2 CLKs to provide the first delayed signal S21 in accordance with the control pulse from the signal generator 27, which signal S21 is input to the second delay circuit 22, where it is delayed by 2 CLKs to provide the second delayed signal S22 in a similar manner. Other actions in this case are analogous to those of the case of FIG. 8, i.e. the second delayed signal S22 is input together with the image signal S20 to the adder 23, where they are added to provide the added signal S23 that is input to the first coefficient multiplier 24, where it is multiplied by the coefficient K1 that is equivalent to "½" to provide a multiplied signal as the signal S24, and the first delayed signal S21 is input to the second coefficient multiplier 25, where it is multiplied by the coefficient K2 that is equivalent to "1" to provide a multiplied signal as the signal S25, while the multiplied signal S24 is subtracted from the multiplied signal S25 at the adder 26 to provide the contour compensation signal S26.

In this case, as τ=2 CLKs=2/fc [sec] in the expression (1), the boost frequency f is equivalent to that of the expression (3) of the previous embodiment.

Figure 10:
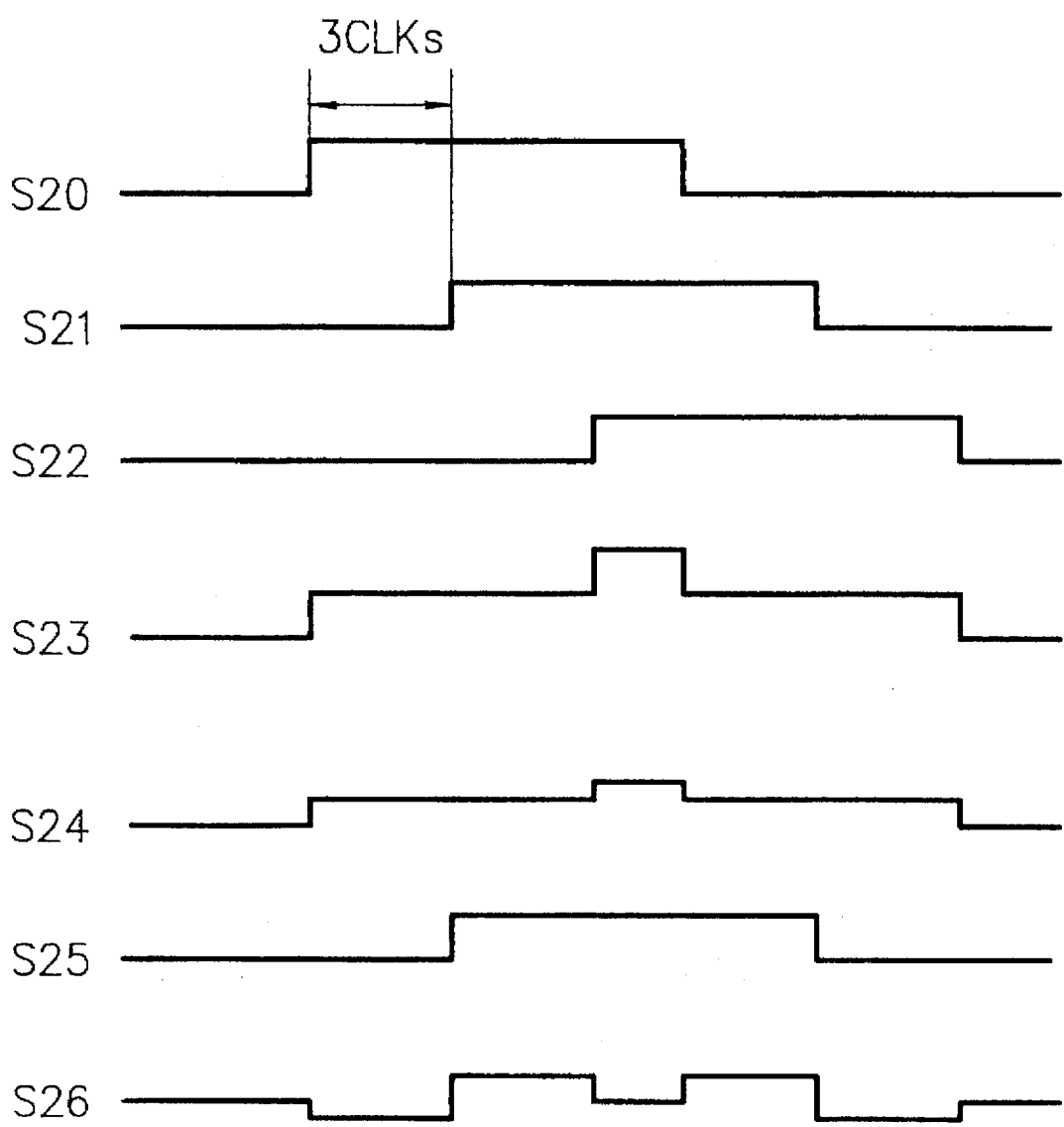
FIG. 10 illustrates time charts of various signals in the digital filter of FIG. 7, as the multiplication coefficient table of FIG. 4C is applied.

FIG. 10 illustrates time charts of various signals in the digital filter of FIG. 7, as the multiplication coefficient table of FIG. 4C is applied.

In the case of FIG. 10, the image signal S20 is input to the first delay circuit 21, where it is delayed by 3 CLKs to provide the first delayed signal S21 in accordance with the control pulse from the signal generator 27, which signal S21 is input to the second delay circuit 22, where it is delayed by 3 CLKs to provide the second delayed signal S22 in a similar manner. Other actions in this case are analogous to those of the case of FIG. 8, In the case FIG. 10, as τ=3 CLKs=3/fc [sec] in the expression (1), the boost frequency f is equivalent to that of the expression (4) of the previous embodiment.

In the present embodiment, the delay circuits are two in number, which may well be modified to constitute a large-scaled circuit in a voluntary manner.

The boost frequency may be otherwise set to change the delay time of the first and second delay circuits 21 and 22, with no provision of additional delay circuits, thus permitting a simplified circuit arrangment to achieve a desired image contour compensation as well as a selection of the boost frequency, and hence a scaled-down device, a reduced power consumption and an increased cost effect, in a still improved manner relative to the previous embodiment.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A digital image contour compensation device having a boost frequency, the device comprising:

a total of 2N-1 delay circuits serially connected for sequentially delaying a digital image signal, where N is a positive integer;

a total of N-1 adders each respectively for adding a pair of delayed signals output from (N±k)-th ones of the 2N-1 delay circuits, where k is an arbitrary positive integer such that k<N;

a select means responsible for the boost frequency to select an output signal of one of the N-1 adders to provide a selected signal;

a first multiplier for multiplying the selected signal by a first coefficient;

a second multiplier for multiplying an output signal of an N-th one of the 2N-1 delay circutis by a second coefficient; and another adder for synthesizing output signals of the first and second multipliers.

2. A digital image contour compensation device comprising:

a first variable delay circuit for delaying an input image signal to provide a first delayed signal;

a second variable delay circuit for delaying the first delayed signal to provide a second delayed signal;

a control means for controlling delay times of the first and second delay circuits;

a first multiplier for multiplying the first delayed signal by a first coefficient;

a first adder for adding the second delayed signal to the input image signal to provide an added signal;

a second multiplier for multiplying the added signal by a second coefficient; and a second adder for synthesizing output signals of the first and second multipliers.

3. A digital image contour compensation device according to claim 2, wherein:

the digital image contour compensation device has a boost frequency; and the control means is responsible for the boost frequency to generate a pulse signal for controlling the delay times of the first and second delay circuits.

* * * * *